United States Patent
Caveney

(10) Patent No.: US 8,315,069 B2
(45) Date of Patent: Nov. 20, 2012

(54) SPILLOVER FITTING FOR ROUTING CABLES

(75) Inventor: Jack E. Caveney, North Palm Beach, FL (US)

(73) Assignee: Panduit Corp., Tinley Park, IL (US)

( * ) Notice: Subject to any disclaimer, the term of this patent is extended or adjusted under 35 U.S.C. 154(b) by 221 days.

(21) Appl. No.: 12/629,395

(22) Filed: Dec. 2, 2009

(65) Prior Publication Data

US 2010/0142176 A1 Jun. 10, 2010

Related U.S. Application Data

(60) Provisional application No. 61/119,871, filed on Dec. 4, 2008.

(51) Int. Cl.
*H02B 1/20* (2006.01)

(52) U.S. Cl. .................................................. 361/826

(58) Field of Classification Search .......... 361/826, 361/814, 823; 174/60, 70, 101; 385/134–137
See application file for complete search history.

(56) References Cited

U.S. PATENT DOCUMENTS

| | | |
|---|---|---|
| 4,163,572 A | 8/1979 | Benscoter |
| 4,366,341 A | 12/1982 | Van Riet |
| 4,372,511 A | 2/1983 | Knowles |
| 4,860,168 A | 8/1989 | Wiljanen et al. |
| 4,926,009 A | 5/1990 | Van Leeuwen |
| 5,316,244 A | 5/1994 | Zetena, Jr. |
| 5,399,814 A | 3/1995 | Staber et al. |
| 5,872,336 A | 2/1999 | Long |
| 5,929,380 A | 7/1999 | Carlson, Jr. et al. |
| 5,937,131 A | 8/1999 | Haataja et al. |
| 6,044,194 A | 3/2000 | Meyerhoefer |
| 6,192,181 B1 | 2/2001 | Haataja et al. |
| 6,522,823 B1 * | 2/2003 | Wentworth et al. ............ 385/134 |
| 6,535,683 B1 | 3/2003 | Johnson et al. |
| 6,597,854 B2 | 7/2003 | Haataja et al. |
| 6,633,718 B1 | 10/2003 | Thom |
| 6,868,220 B2 | 3/2005 | Haataja et al. |
| 6,925,242 B2 | 8/2005 | Haataja et al. |
| 7,167,625 B2 | 1/2007 | Haataja et al. |
| 2007/0253672 A1 | 11/2007 | Haataja et al. |
| 2008/0199141 A1 | 8/2008 | Haataja et al. |
| 2009/0050349 A1 | 2/2009 | Caveney |

FOREIGN PATENT DOCUMENTS

| | | |
|---|---|---|
| DE | 3742448 A1 | 6/1989 |
| EP | 1684104 A2 | 7/2006 |
| WO | 2009142885 A1 | 11/2009 |

OTHER PUBLICATIONS

Panduit Pan-Net Network Solutions catalog cover page, pp. C3.1-C3.3; C3.9-C3.11; and back cover, Jul. 2007.

* cited by examiner

*Primary Examiner* — Jeremy Norris
*Assistant Examiner* — Tremesha S Willis
(74) *Attorney, Agent, or Firm* — Robert A. McCann; Christopher S. Clancy

(57) ABSTRACT

The present invention is directed to a spillover fitting that routes cables from a lateral trough. The spillover fitting includes fitting walls and a floor positioned between the fitting walls. The floor has an extension flange that extends into the lateral trough. The spillover fitting also includes a containment member that extends from the extension flange. The containment member is positioned over the lateral trough to contain cables routed out of the lateral trough into the spillover fitting.

11 Claims, 14 Drawing Sheets

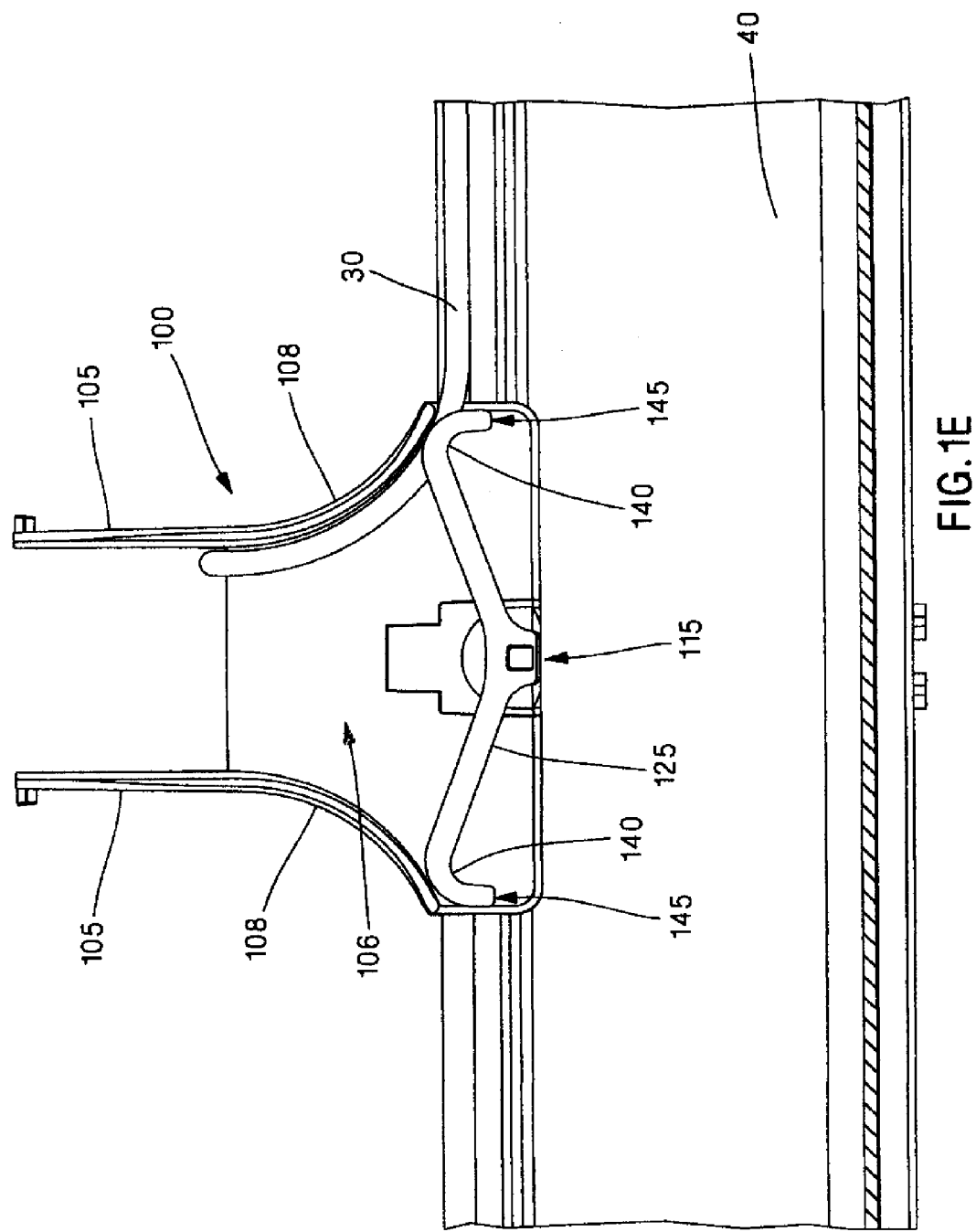

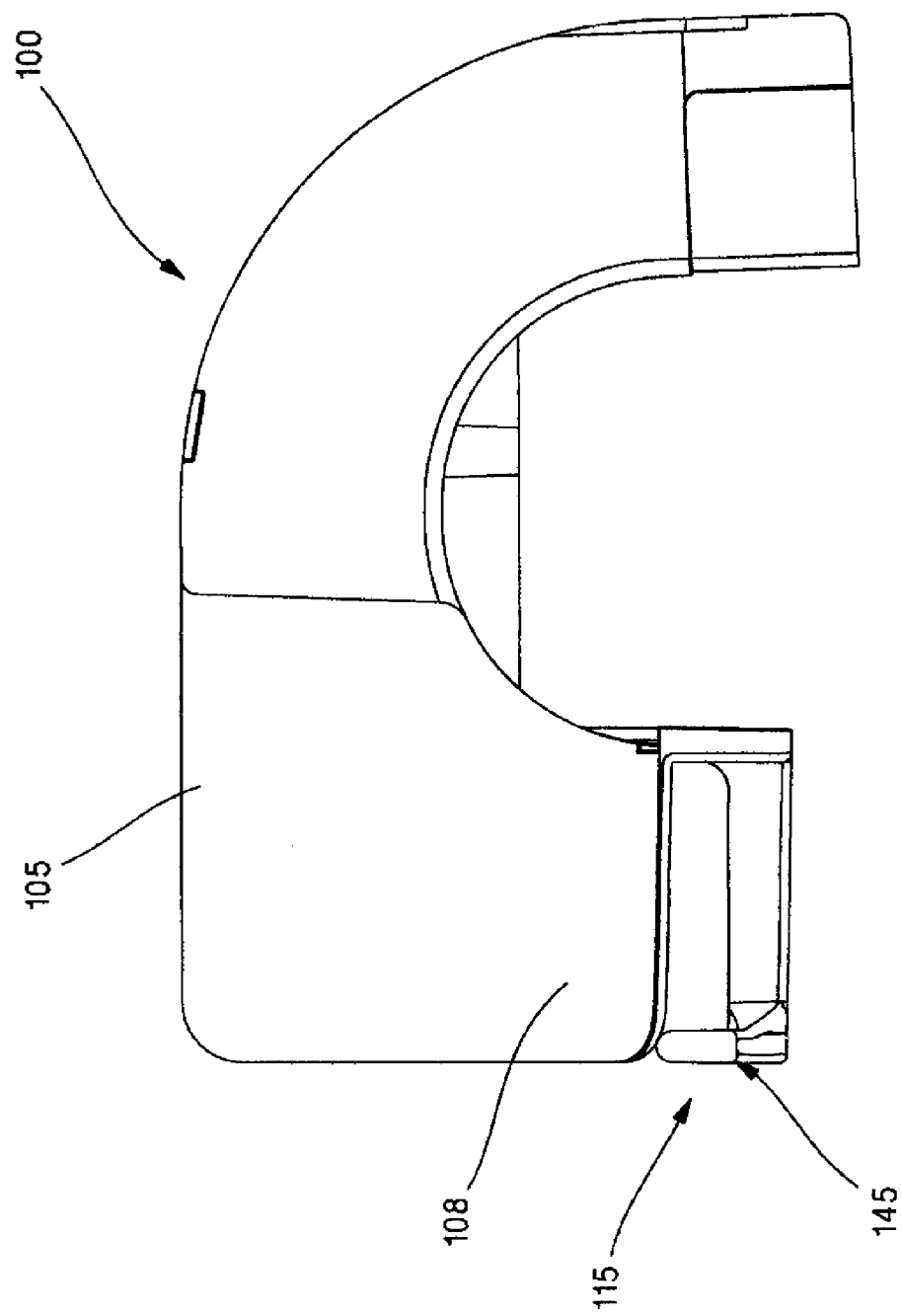

US 8,315,069 B2

SPILLOVER FITTING FOR ROUTING CABLES

CROSS-REFERENCE TO RELATED APPLICATION

This application claims priority to U.S. Provisional Application No. 61/119,871, filed Dec. 4, 2008, the subject matter of which is hereby incorporated by reference in its entirety.

FIELD OF THE INVENTION

The present invention relates generally to cable management and, more particularly, to a spillover fitting for use in field applications, such as installations using raceways, troughs or other cable management apparatus.

BACKGROUND OF THE INVENTION

Cable exit trough or spillover devices that help route cables out of and over the sidewalls of ducts and raceways are well-known. When dealing with fiber optic cables, it is also well-known that the spillover fitting should provide bend radius control for the cables being routed. Therefore, it would be desirable to have an improved spillover fitting.

SUMMARY OF THE INVENTION

A spillover fitting is positioned on a lateral trough to route cables from the lateral trough. The spillover fitting includes fitting walls and a floor positioned between the fitting walls. The floor includes an extension flange that extends into the lateral trough. The spillover fitting also includes a containment member that extends from the extension flange. The containment member is positioned over the lateral trough for containing cables routed out of the lateral trough into the spillover fitting.

BRIEF DESCRIPTION OF THE DRAWINGS

FIG. 1E is a front elevational view of the spillover of FIG. 1A, showing a cable being routed out of a lateral trough;

FIG. 1F is a side elevational view of the spillover of FIG. 1A;

DETAILED DESCRIPTION OF THE PRESENTLY PREFERRED EMBODIMENTS

Figure 1A:
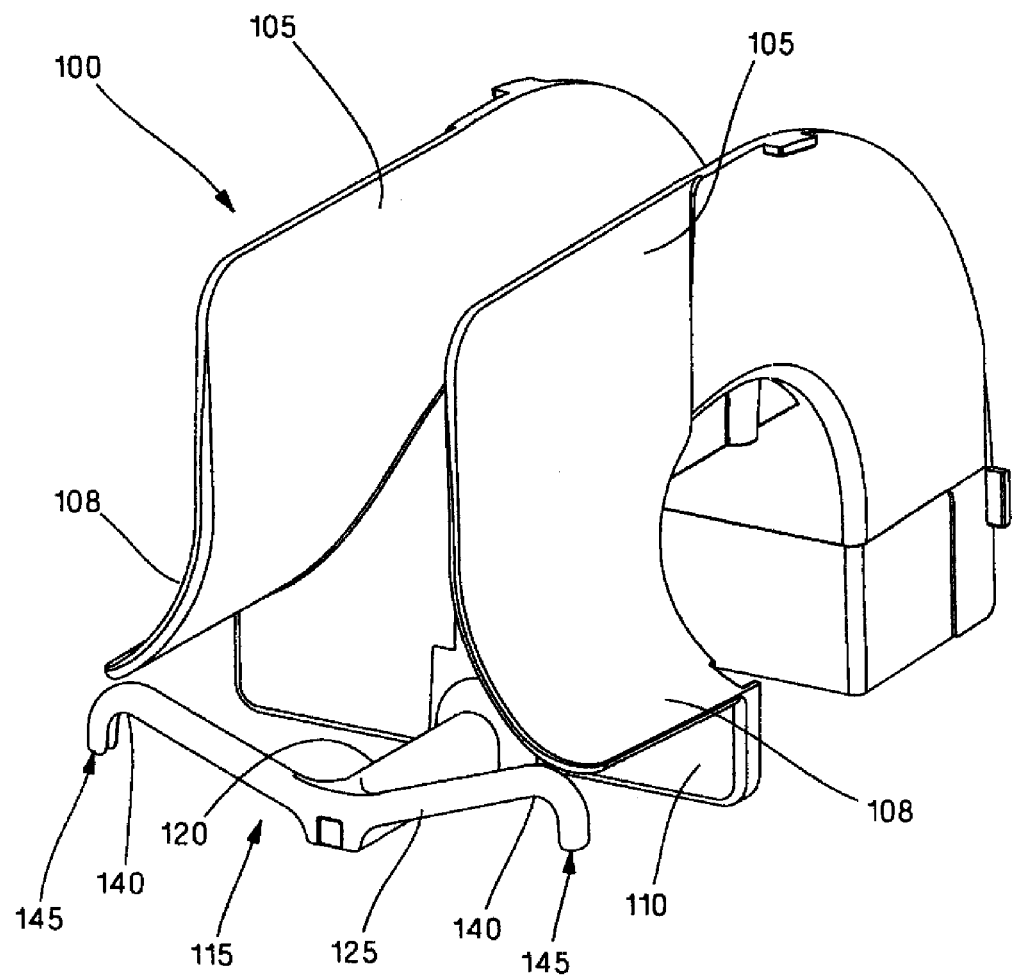
FIG. 1A is a front perspective view of a spillover in accordance with the present invention.
Figure 1B:
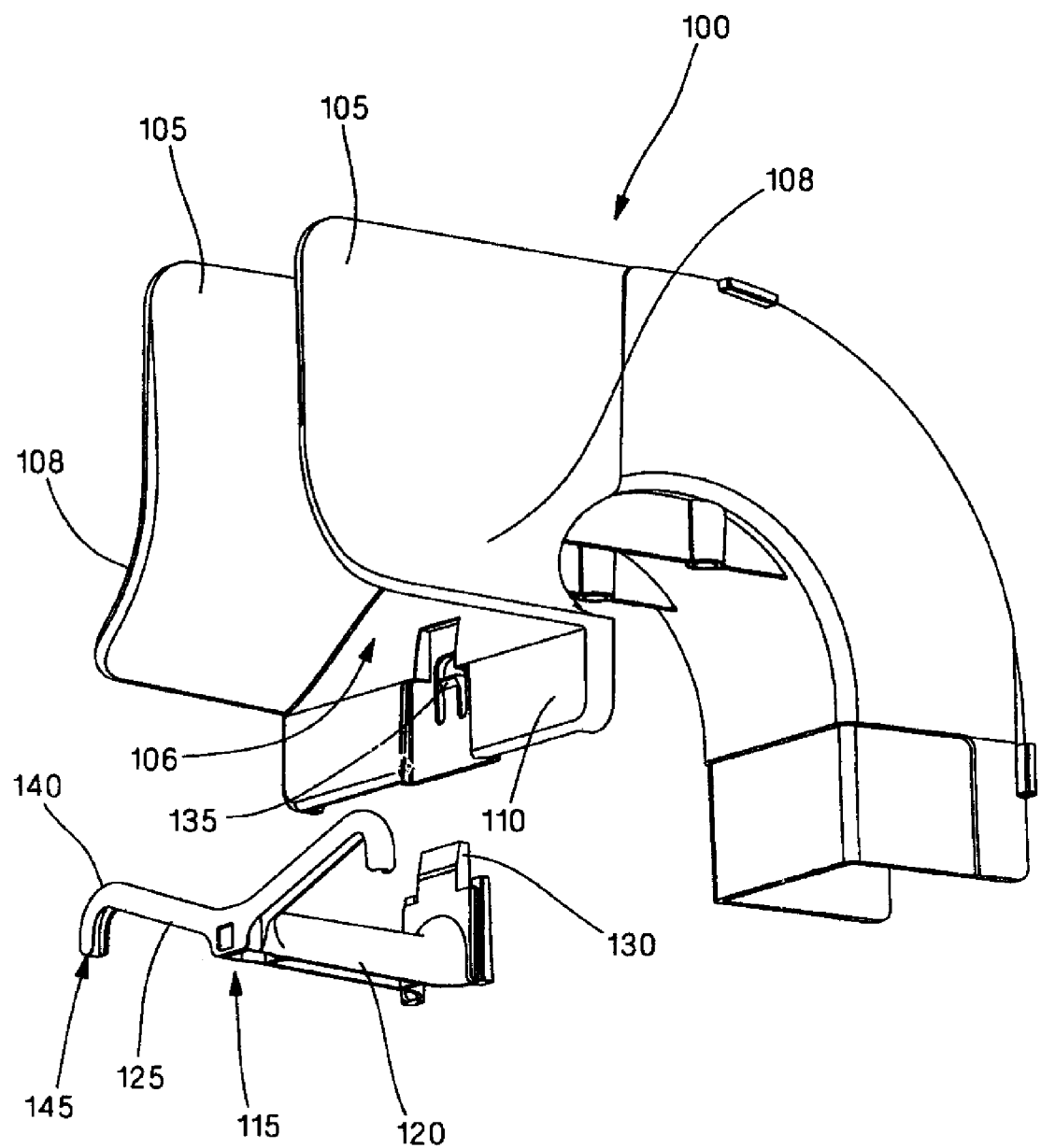
FIG. 1B is an exploded perspective view of the spillover of FIG. 1A.
Figure 1C:
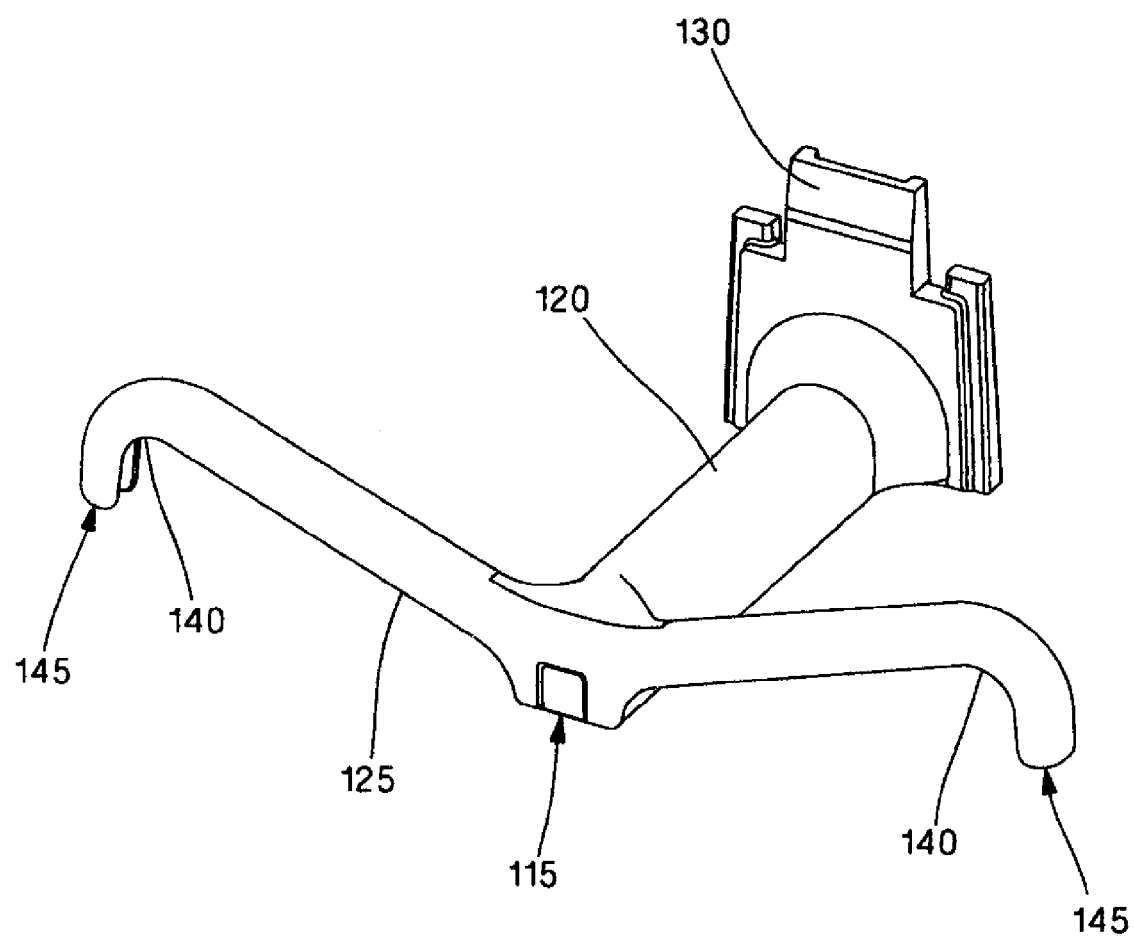
FIG. 1C is a perspective view of a containment member of the spillover of FIG. 1A.
Figure 1D:
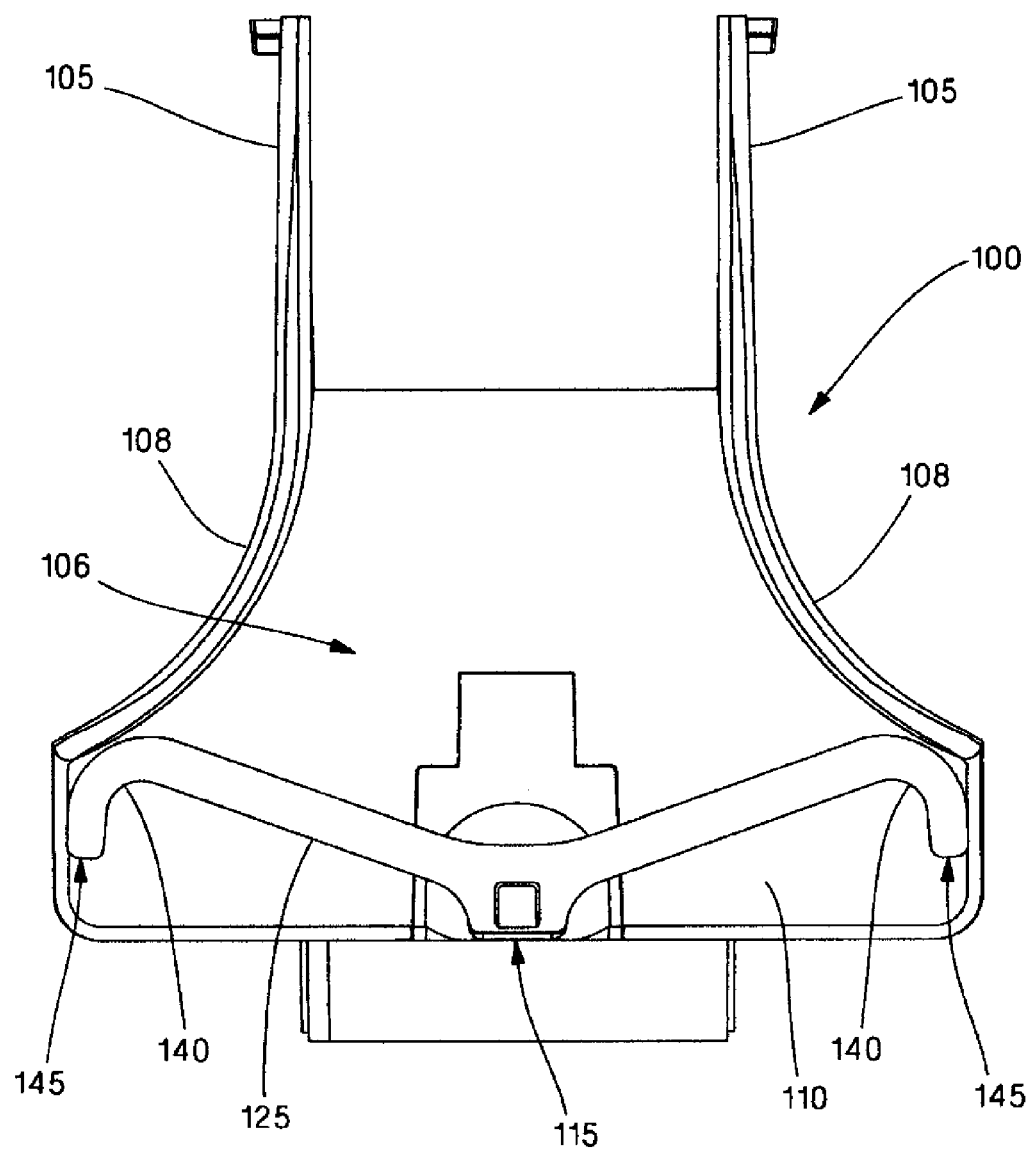
FIG. 1D is a front elevational view of the spillover of FIG. 1A.

FIGS. 1A-1F illustrate one embodiment of a spillover 100, which is shown as having a 2×2 inch exit end geometry. Spillover 100 has two walls 105 and a floor 106 that define an exit path for cables 30 routed from the lateral trough 40. Each wall 105 has a curved lead-in wall 108 extending therefrom so as to be disposed over the lateral trough 40 that may provide control for cables 30 being routed out of the lateral trough 40. The lead-in walls 108 do not extend below the top of the side wall of the lateral trough 40, as shown in FIG. 1E. The floor 106 also includes an extension flange 110.

As can also be seen in FIGS. 1A-1F, the spillover 100 includes a containment member 115, which is generally T-shaped and has a first portion 120 and a second portion 125. The containment member 115 is formed separately from the spillover 100 and connected by appropriate means. In this embodiment, the containment member 115 has a snap feature 130 that engages a corresponding snap arm 135 to secure the containment member 115 to the floor extension flange 110 of spillover 100 (see FIG. 1B). It is understood that the containment member 115 can also be formed integrally with the spillover 100.

The first portion 120 of the containment member 115 extends perpendicular to, and from the midpoint of, the floor extension flange 110 and is disposed over the lateral trough 40. Preferably, the first portion 120 is rounded so as to provide protection for any cables that enter the spillover fitting by passing on either side of the first portion 120. The second portion 125 includes a pair of arms that extend in opposite directions perpendicular to the first portion 120. Each arm of the second portion 125 has a curved section 140 at each distal end 145 adjacent the wall 108, as best seen in FIG. 1F. The containment member 115 is made from a flexible yet resilient material such as plastic so that the two arms of the second portion 125 can be deflected to allow cables 30 to be routed out of the lateral trough 40 and into the spillover 100 with ease, and then return to their original position, thereby helping to contain the cables 30 within the spillover 100.

Figure 2A:
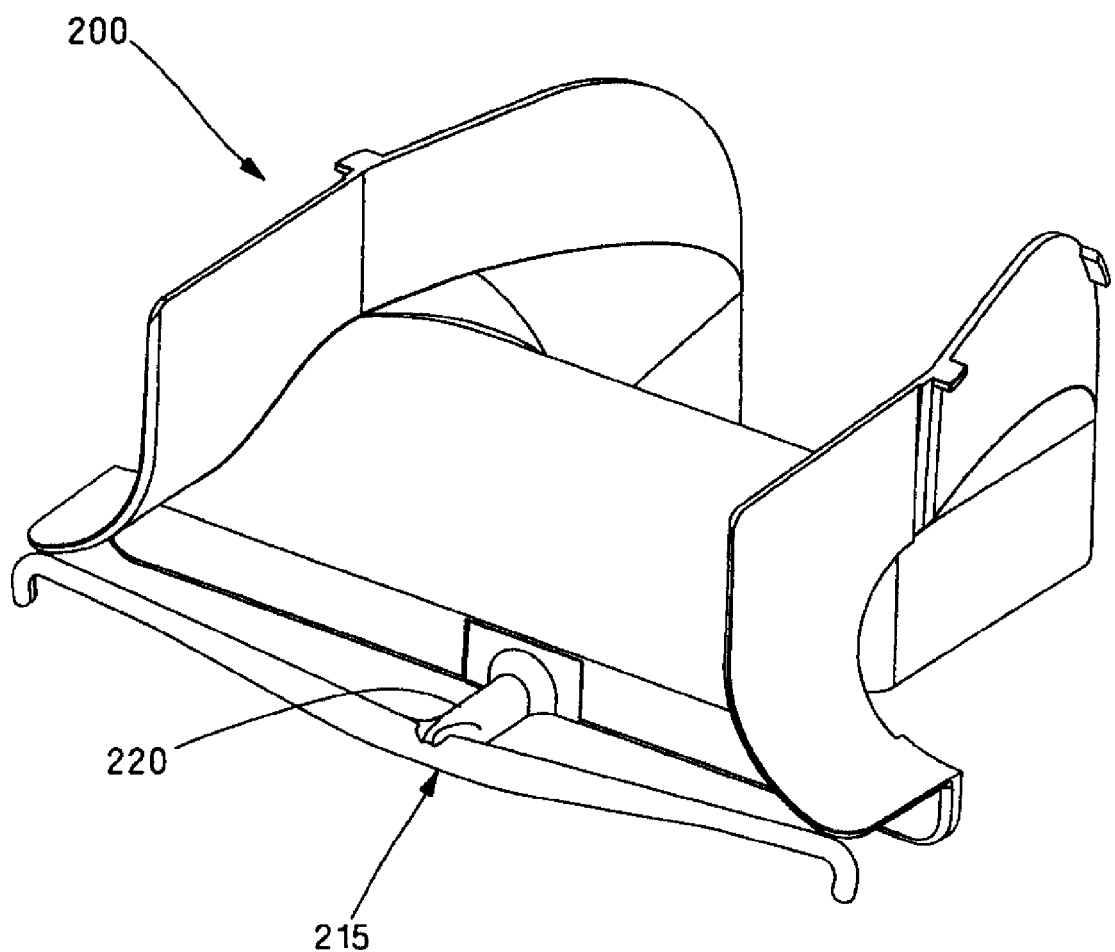
FIG. 2A is a front perspective view of an alternate embodiment of a spillover in accordance with the present invention.
Figure 2B:
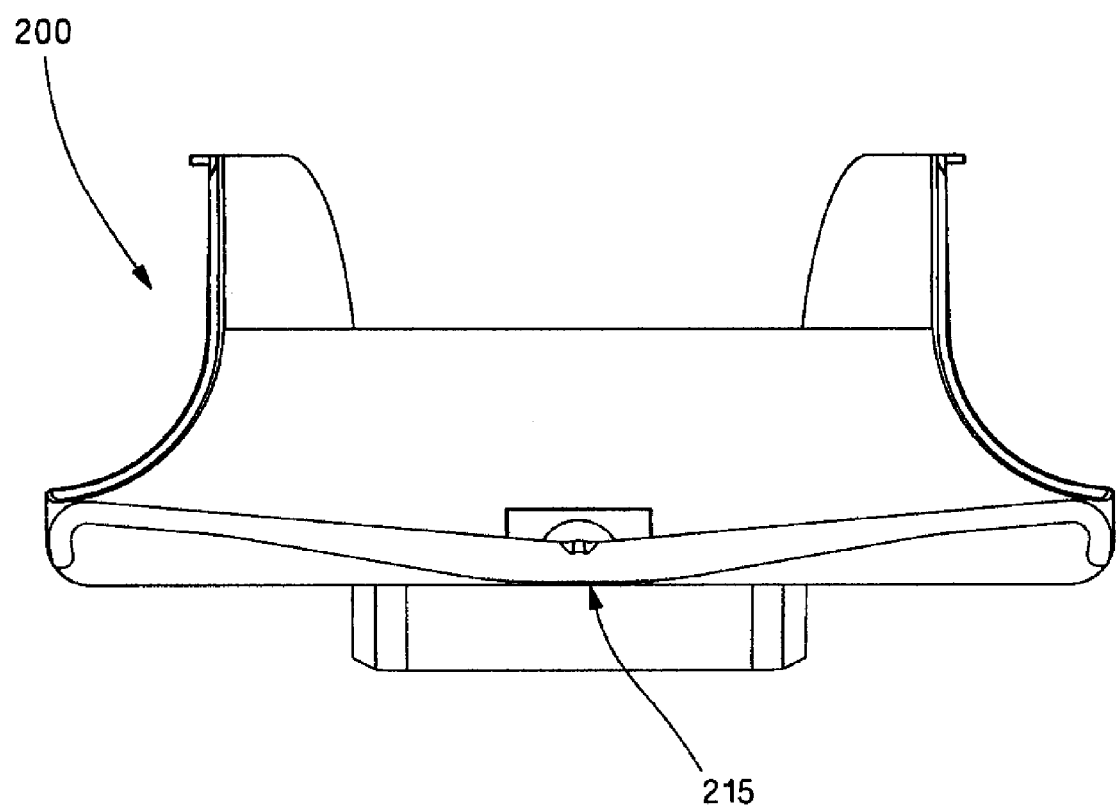
FIG. 2B is a front elevational view of the spillover of FIG. 2A.

FIGS. 2A and 2B disclose another embodiment of a spillover 200, which is shown as having a 4×4 inch exit geometry. Spillover 200 is the same as spillover 100 except for the size of the spillover 200 and the configuration of the containment member 215. In this embodiment, the containment member 215 is larger than the containment member 115 due to the size of the spillover 200.

Figure 3A:
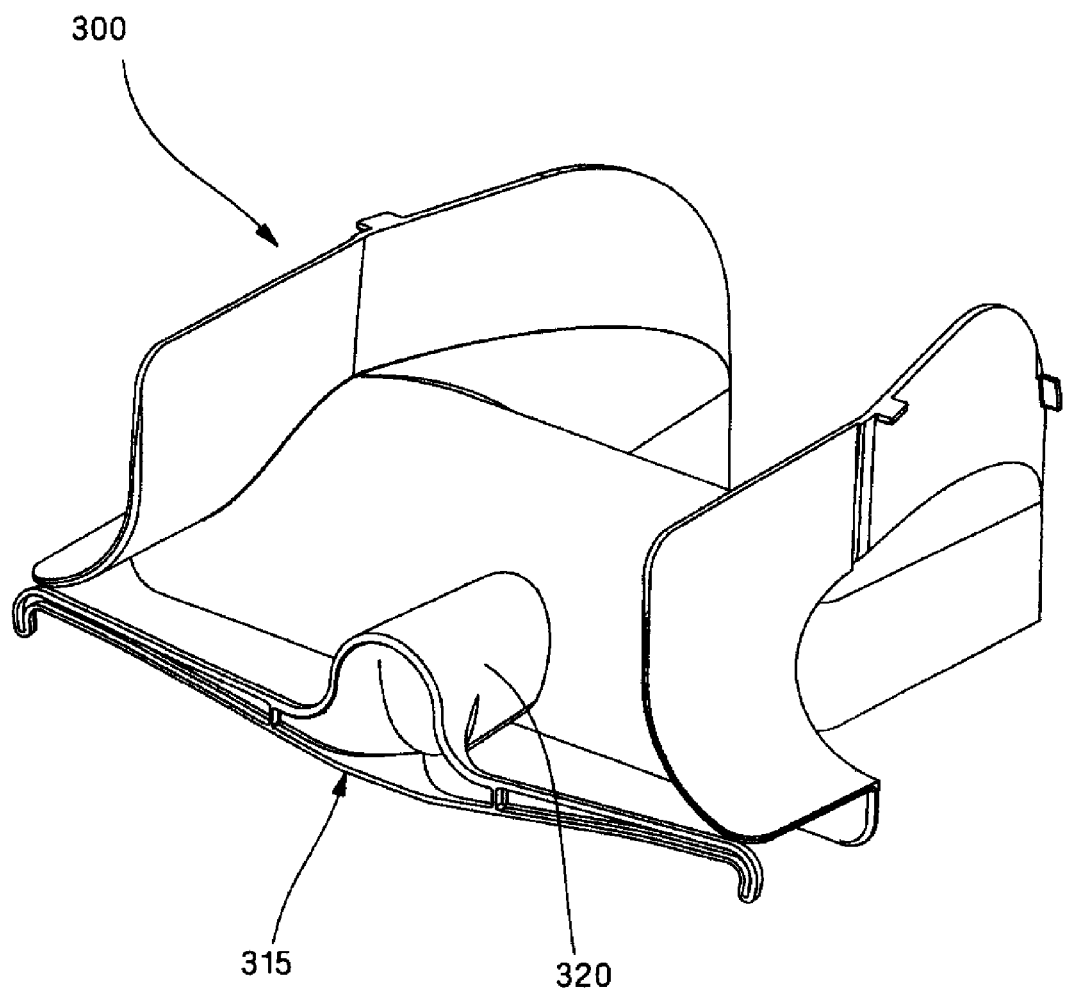
FIG. 3A is a front perspective view of another alternate embodiment of a spillover in accordance with the present invention.
Figure 3B:
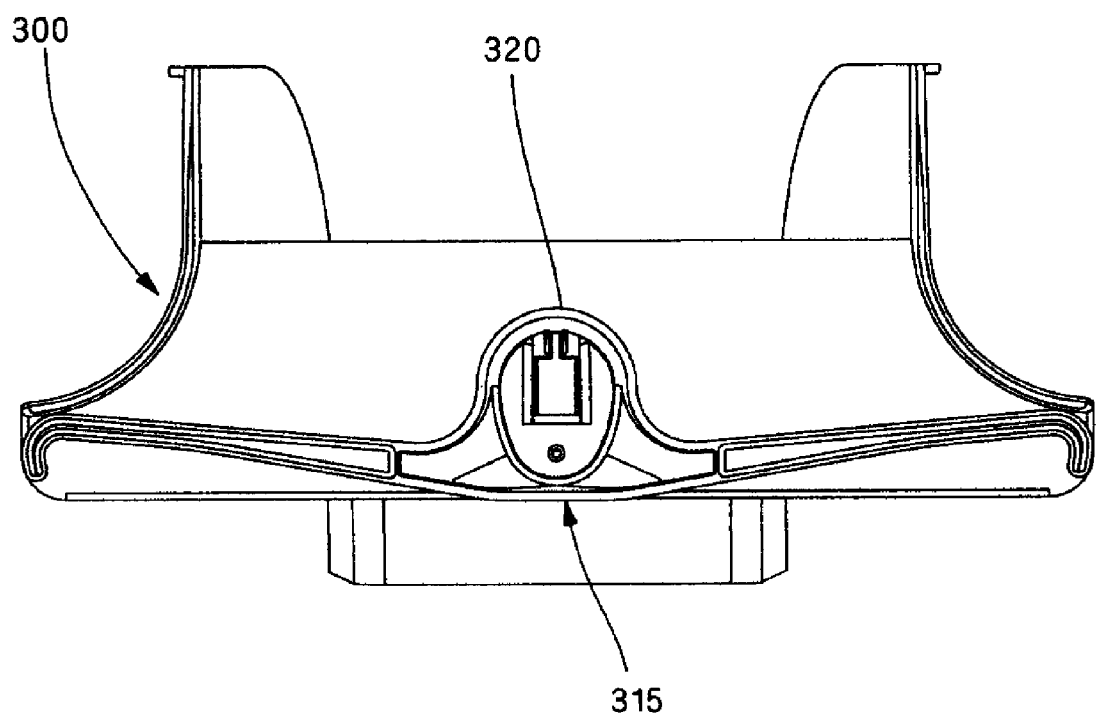
FIG. 3B is a front elevational view of the spillover of FIG. 3A.
Figure 3C:
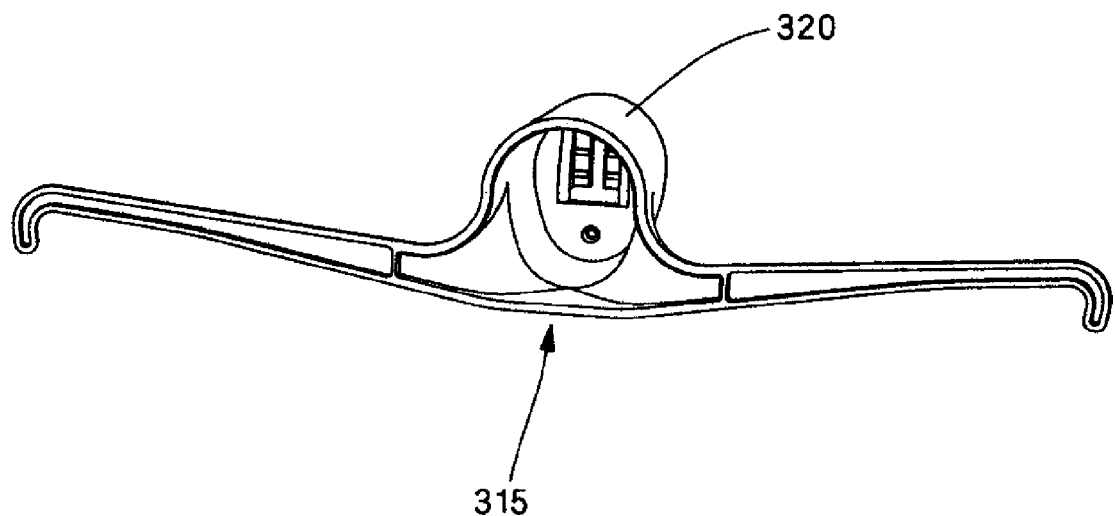
FIG. 3C is a front perspective view of a containment member of the spillover of FIG. 3A.

FIGS. 3A-3C disclose another embodiment of a spillover 300. Spillover 300 is the same as spillover 200 except for the configuration of the containment member 315. In this embodiment, the first portion 320 of the containment member 315 is formed large enough and with the appropriate radii to provide minimum bend radius control for cables passing on either side of the first portion 320.

Figure 4A:
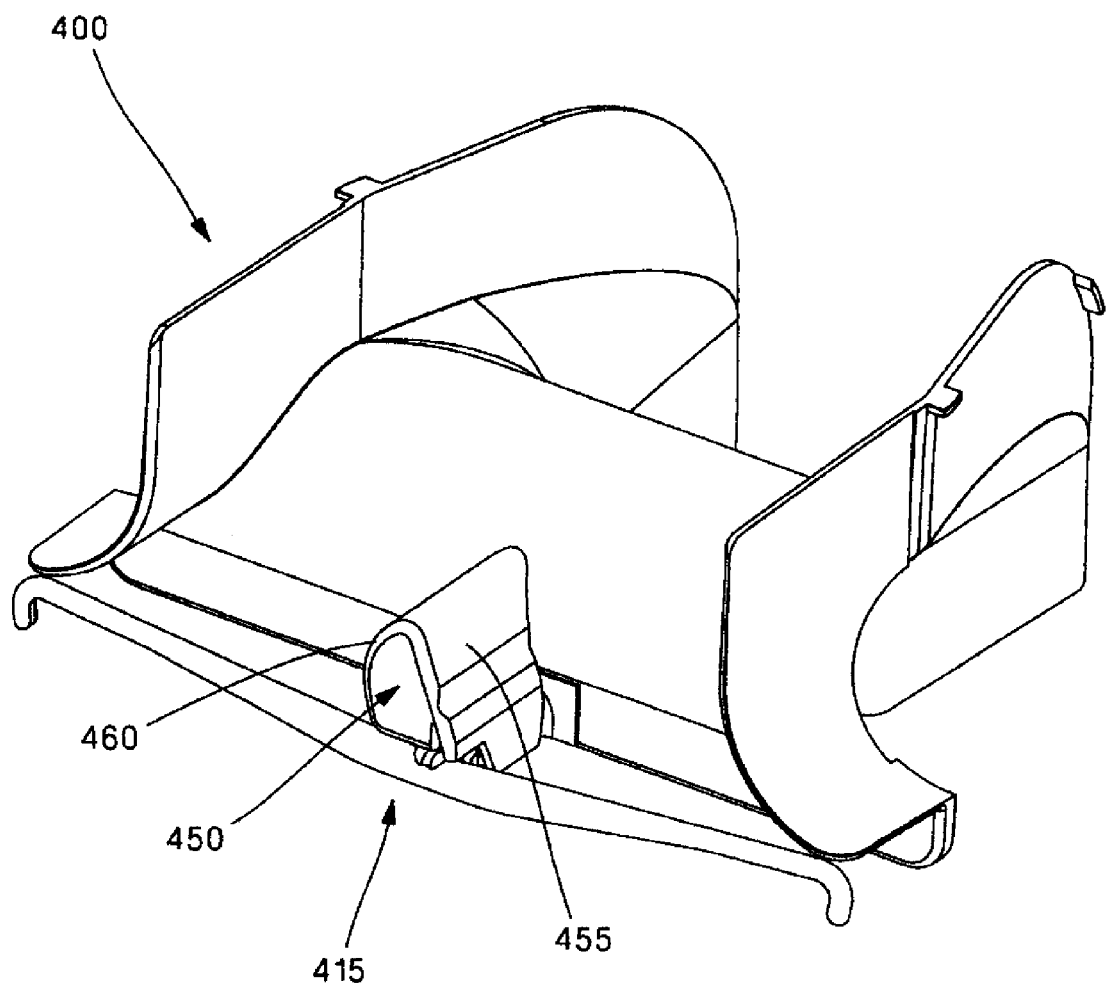
FIG. 4A is a front perspective view of another alternate embodiment of a spillover in accordance with the present invention.
Figure 4B:
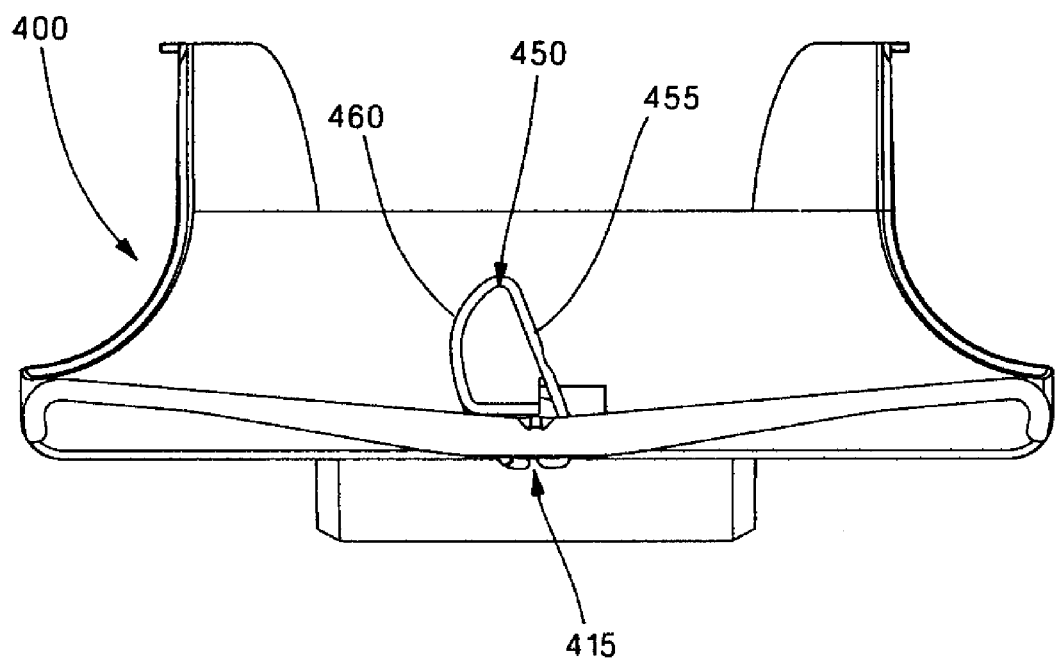
FIG. 4B is a front elevational view of the spillover of FIG. 4A.
Figure 4C:
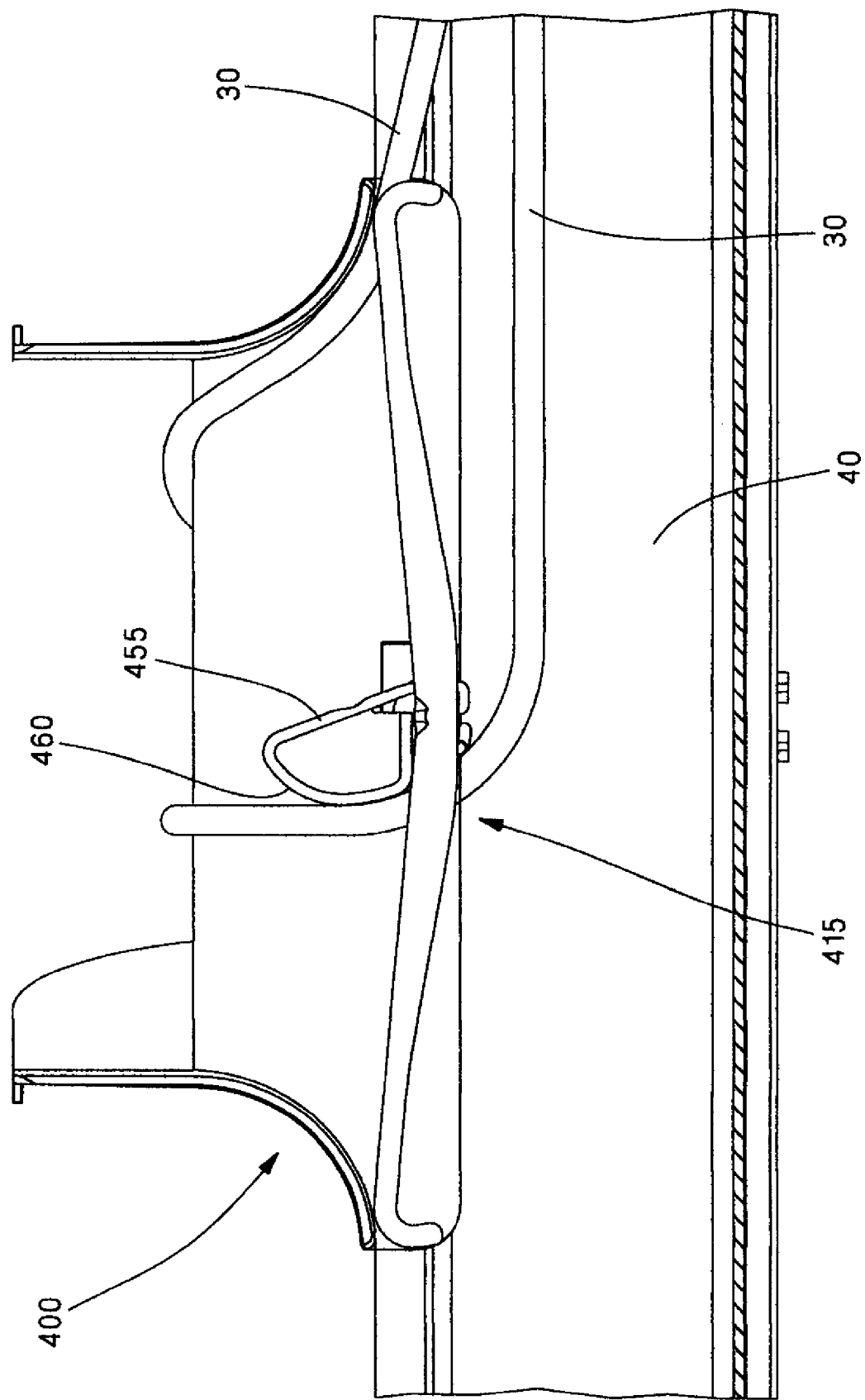
FIG. 4C is a front elevational view of the spillover of FIG. 4A, showing cables being routed out of a lateral trough.

FIGS. 4A-4C disclose another embodiment of a spillover 400. Spillover 400 is the same as spillover 200 except for the addition of a bend radius control member 450 which clips onto the first portion (not shown, but the same as first portion 220) of the containment member 415. As best seen in FIGS. 4B and 4C, the bend radius control member 450 has a first generally flat side 455 and a second curved side 460 opposite the first side 455. As shown in FIG. 4C, when cables 30 exit the lateral trough 40 from the right side as shown and enter the spillover 400, the second side 460 provides bend radius control for cables 30 that are routed along the second side 460. While the bend radius control member 450 shown is not reversible, it is understood that this could be done if desired. A mirror image of the configuration of control member 450 could be used to control cables 30 exiting the lateral trough 40 from the left side.

The foregoing description of examples of the invention has been presented for purposes of illustration and description, and is not intended to be exhaustive or to limit the invention to the precise form disclosed. The description was selected to best explain the principles of the invention and its practical application to enable others skilled in the art to best utilize the invention in various embodiments and various modifications as are suited to the particular use contemplated. It is intended that the scope of the invention not be limited by the specification.

The invention claimed is:

1. A fitting for routing cables from a first direction to a second direction that is substantially perpendicular to the first direction, comprising: a wall defining an inner surface disposed to contact and thereby route the cables from the first direction, at least a portion of the inner surface being curved along a first axis that is substantially parallel to the second direction; and a floor defining an upper surface disposed to contact and thereby route the cables to the second direction, at least a portion of the upper surface being curved along a second axis that is substantially perpendicular to the first axis; wherein: the curved portion of the first inner surface intersects the curved portion of the upper surface of the floor so as to define a continuous curved line that at this intersection extends from the first direction to the second direction; and the curvature of the portion of the upper surface begins at a same point on the intersection as the curvature of the portion of the inner surface.

2. The fitting of claim 1, wherein the curvature of the portion of the upper surface substantially coincides with the curvature of the portion of the inner surface along the length of the intersection.

3. The fitting of claim 1, further comprising a first fitting wall that projects from the upper surface of the floor in a direction parallel to the first axis.

4. The fitting of claim 1, further comprising a second fitting wall opposing the first fitting wall and being disposed at an opposite side of the floor from the first fitting wall relative to the second axis.

5. A spillover fitting for routing cables from a lateral trough including a trough wall, the spillover fitting comprising:
a planar fitting wall; and
a curved lead-in wall extending from a bottom of the fitting wall and configured to be positioned over, entirely above, and adjacent to the lateral trough when the spillover fitting is installed on the lateral trough; and
a curved floor positioned adjacent to the fitting wall and intersecting the curved lead-in wall, the intersection of the lead-in wall and the floor beginning at a top of the trough wall.

6. The spillover fitting of claim 5, wherein the intersection of the lead-in wall and the floor is a twisted curve.

7. The spillover fitting of claim 5, further comprising:
another fitting wall substantially parallel to the fitting wall; and
another curved lead-in wall extending from a bottom of the other fitting wall to intersect the curved floor and configured to be positioned over, above, and adjacent to the lateral trough when the spillover fitting is installed on the lateral trough, the intersection of the other lead-in wall and the floor beginning at a top of the trough wall.

8. A fitting for routing cables from a first direction lying in a lateral trough having a trough wall to a second direction that is substantially perpendicular to the first direction, the fitting comprising:
a wall defining an inner surface disposed to contact and thereby route the cables from the first direction, at least a portion of the inner surface being curved along a first axis that is substantially parallel to the second direction; and
a floor defining an upper surface disposed to contact and thereby route the cables to the second direction, at least a portion of the upper surface being curved along a second axis that is substantially perpendicular to the first axis;
wherein:
the curved portion of the inner surface intersects the curved portion of the upper surface of the floor so as to define a continuous curved line that extends from the first direction to the second direction; and
the intersection of the curved portion of the upper surface and the curved portion of the inner surface begins at a top of the trough wall.

9. The fitting of claim 8, wherein the curvature of the portion of the upper surface substantially coincides with the curvature of the portion of the inner surface along the length of the intersection.

10. The fitting of claim 8, further comprising a first fitting wall that projects from the upper surface of the floor in a direction parallel to the first axis.

11. The fitting of claim 8, further comprising a second fitting wall opposing the first fitting wall and being disposed at an opposite side of the floor from the first fitting wall relative to the second axis.

* * * * *